May 26, 1942.    J. T. GROTENHUIS    2,283,986
HEATER
Filed Feb. 1, 1939    2 Sheets-Sheet 1
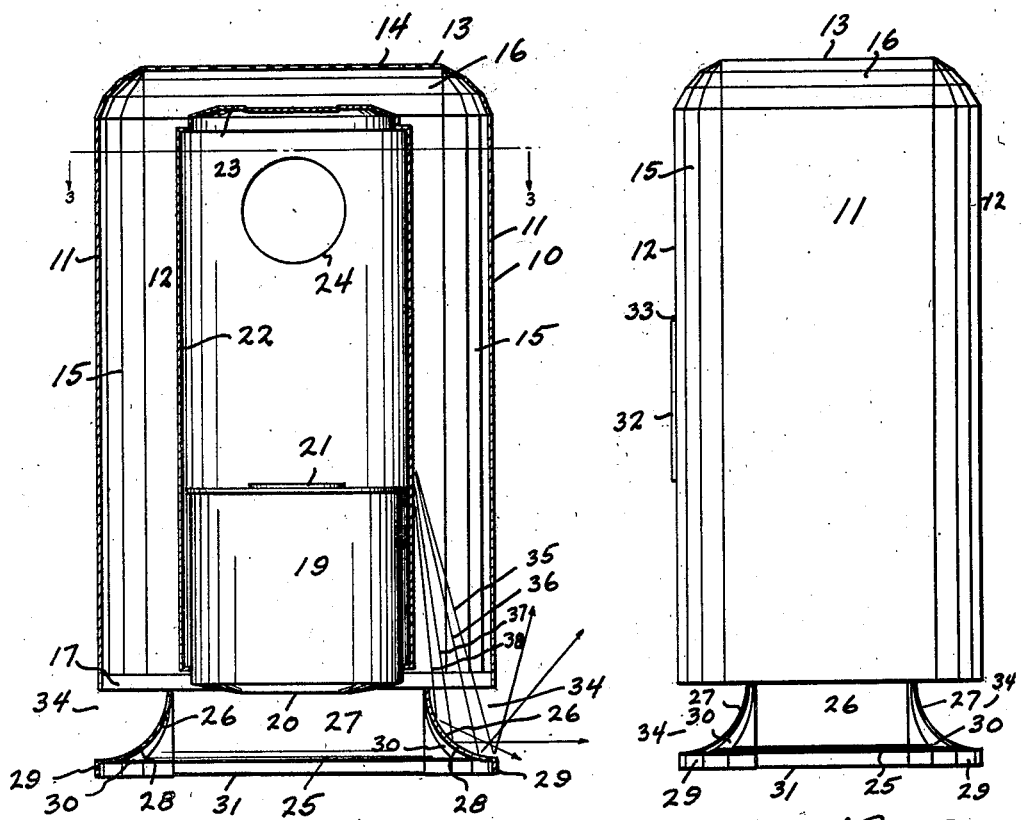
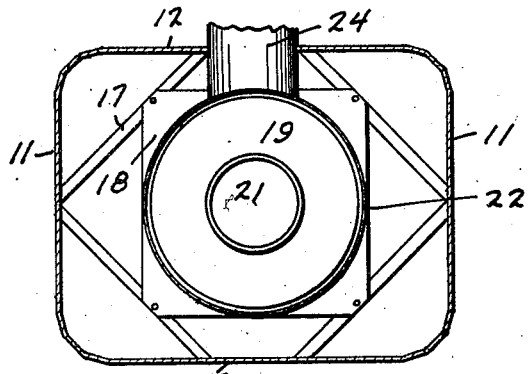
INVENTOR.
James T. Grotenhuis
BY Sam J. Slotsky
ATTORNEY.

May 26, 1942.  J. T. GROTENHUIS  2,283,986
HEATER
Filed Feb. 1, 1939  2 Sheets-Sheet 2

INVENTOR.
James T. Grotenhuis
BY Sam J. Slotky
ATTORNEY.

Patented May 26, 1942

2,283,986

UNITED STATES PATENT OFFICE 2,283,986

HEATER

James T. Grotenhuis, Orange City, Iowa

Application February 1, 1939, Serial No. 254,054

1 Claim. (Cl. 126—110)

My invention relates to a heater more specifically of an oil burning type.

An object of my invention is to provide a heater having a base structure which will deflect or direct air currents upwardly or downwardly in a proper manner consistent with the best efficiency.

A further object of my invention is to provide a heater which provides the combination of an up and a down draft.

A further object of my invention is to provide a heater which provides elements so arranged that an intimate contact is provided during upward and downward travel of the heat conveying currents etc.

A further object of my invention is to provide a heater which provides a combination of a restricted cross section for forced draft and a larger section for natural draft or circulation.

A further object of my invention is to provide a plurality of combustion chambers connected in series with or without a similar number of burners so that the gases will pass through the successive combustion chambers and thence to the stack to provide a greater heating efficiency to the entire unit with a reduced amount of fuel being necessary.

A further object of my invention is to provide a heater having a blower member in the base thereof for circulating the air in the heater.

A further object of my invention is to provide means for conveying the heated air currents in an area practically around the entire base perimeter of the heater in an unrestricted manner.

A further object of my invention is to provide a heater which will effectively radiate heat from the combustion chamber shell to the base and thence in a direction to secure a greater efficiency thereof.

A further object of my invention is to provide a heater which can be regulated, which is easy to clean and which can be manufactured at a reasonable cost.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a sectional view taken through one form of the heater,

Figure 2 is an end elevation,

Figure 3 is a sectional view taken along the lines 3—3 of Figure 1,

Figures 4, 5:
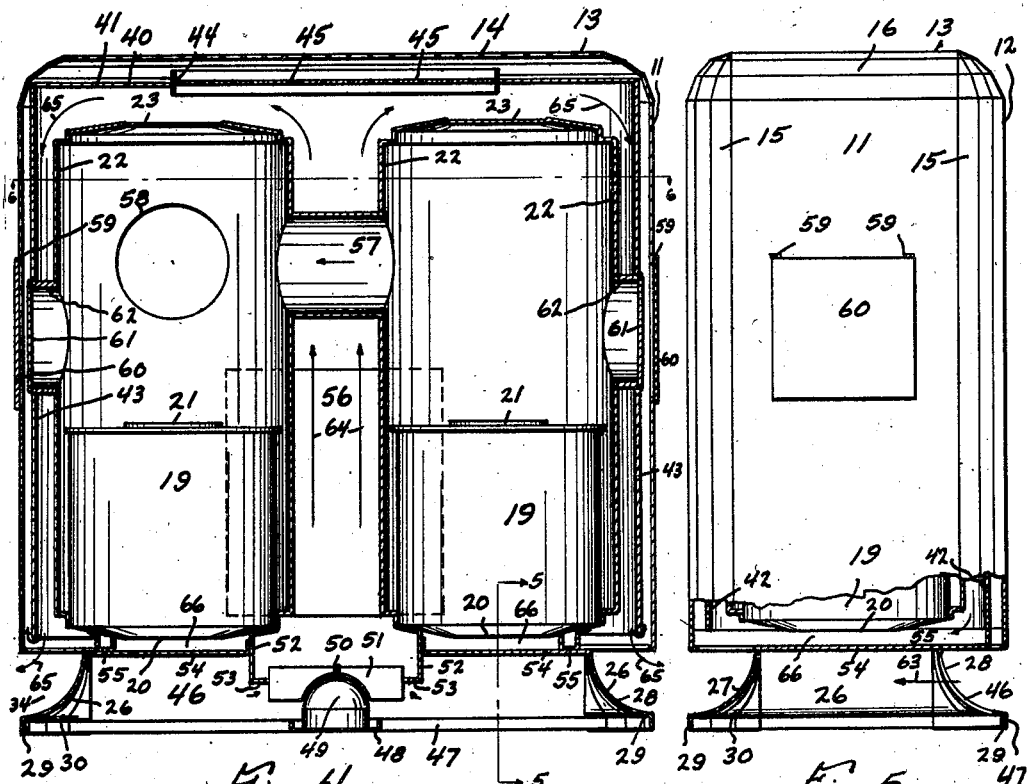
Figure 4 is a modification.
Figure 5 is an end elevation with a portion thereof taken in section along the lines 5—5 of Figure 4.

I have used the character 10 to represent the outer shell or casing of the heater which includes the end walls 11 and the side walls 12 and which includes the top member 13 having the grill opening 14. Each corner of the casing includes the integrally formed vertical flat portions 15 which merge with the further horizontal flat portions 16. Attached in angular relation to the ends 11 and the sides 12 are the supporting members 17 upon which is mounted a plate 18 which is attached thereto and upon which plate rests the cylindrical burner 19 having the lower opening 20 and the upper opening 21. The burner is not shown in section and can be of a standard type and received about the burner 19 is the cylindrical combustion chamber 22 having the top 23 and communicating with the combustion chamber 23 is the flue connection or pipe 24.

Suitably attached to the member 17 is the base member 25 which base member includes the arcuate ends 26 and the arcuate sides 27, the arcuate configuration thereof being represented by the character 28. The members 26 and 27 are preferably made of sheet metal which are suitably welded or attached to the cast corner legs 29 which includes the same arcuate configuration, being built up, however, of the flat arcuate strips 30 at the corners of the base, being substantially similar to the form of the portions 15. The legs 29 project only a very slight distance below the edges 31 of the sides 26 and 27 to insure stability to the structure. A door 32 for cleaning or lighting the burner is pivoted at 33 to the outer shell which communicates through the combustion shell 22 as will be explained in a later structure to be described.

It will be noted that the outer shell 10 extends downwardly with the lower edge thereof being substantially flush with the upper edge of the arcuate deflecting members 26, 27 and 30. In operation the cold air will enter through the space 34 between the lower edge of the casing and the aforesaid members and due to the heating effect in the combustion chamber 22, the heated air will rise vertically about the combustion chamber and will pass upwardly through the grill 14. This, however, represents only a portion of the total heat generated by the unit and a portion of the heat will be radiated downwardly against the curved portions of the base and thence outwardly about the perimeter of the base.

This is shown more clearly by the lines 35, 36, 37 and 38 which shows the path of travel of typical heat beams with the incidental angles being equal to the reflected angles, so that as a result, besides radiating the heat completely about the base of the heater, the heat will also be reflected in a plane beginning from the floor and upwardly so as a result a considerable volume of heat is radiated at these portions.

The spacing of the base from the outer shell provides a maximum area for the downwardly radiated heat to travel as well as the upwardly passing air currents. It will be noted further that the base structure eliminates the use of that type of heater wherein the vertically positioned legs are employed resulting in a loss of efficiency at the base since the base herein extends to the floor level.

Figure 6:
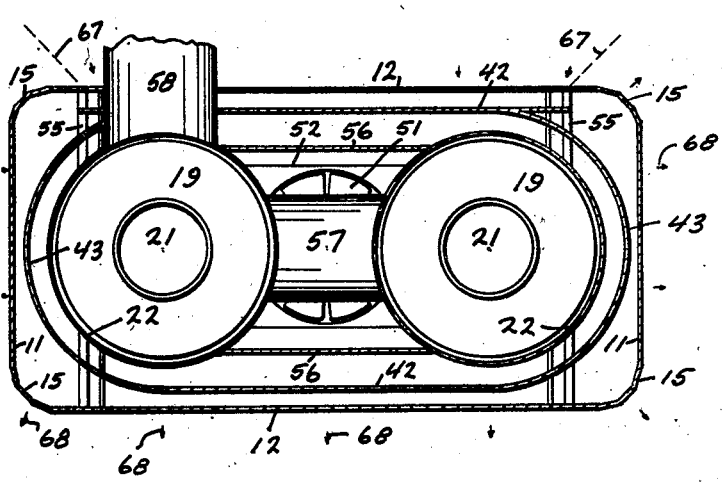
Figure 6 is a section taken along the lines 6—6 of Figure 4.

A modification of the foregoing is shown in Figures 4 to 6 wherein the same general principles are employed with the exception, however, that the heat output of the unit can be regulated and wherein other features will be self-evident from the description. In this form of structure, the outer casing includes the same side and end walls 11 and 12 respectively and includes the same type of upper grill 14 as well as the corner elements 15. Spaced a slight distance interiorly of the outer casing 10 is a further casing 40 having the top wall 41, the side walls 42 and the end walls 43. The top 41 is attached to the rectangular frame 44 in which is pivotally mounted a series of vanes 45 which are suitably pivoted and which include interconnecting links so that the operation of one vane will simultaneously operate others.

This provides a control of the opening within the framework 44 to the grill 14. This heater also employs similar arcuate end members 26 with, however, only a single arcuate member 27 at the forward portion of the base of the heater, with the entire section being removed at 46 at the rear of the base. The opening at 46 is adjacent to the transverse strip 47 which extends across the rear of the base. Attached centrally of the arrangement and within the base is the member 48 in which is mounted the electrically driven motor 49 which carries the shaft 50 to which is attached the fan blades 51.

The blades 51 are adapted to rotate within a substantially square casing 52 having a lower wall 53 positioned as shown with respect to the blades 51. Extending across the base and attached to the casing 52 are the plates 54 upon which are mounted the channel members 55 which are adapted to support at one side the pair of burners 19 which are received within suitable combustion chambers 22. Attached between the combustion shells 22 is the pair of partitions 56 which extend vertically to the approximate height as shown and communicating between the two shells 22 is a pipe 57.

Communicating with the left hand combustion chamber 22 is the flue pipe 58. Pivoted at 59 are a pair of outer doors 60 which communicate with further hinged doors 61 which are suitably hinged to collars 62 which communicate interiorly of the combustion chambers 22.

This provides means for obtaining egress to the burner 19 for lighting, cleaning or other purposes. It will be noted from Figure 5 that the plates 54 extend rearwardly and join with the lower edge of the side wall 42 but are open at the forward portion of the base.

Now that the structure of this modified form of heater has been explained I shall explain the operation thereof.

When using a forced draft, the cold air is drawn in the direction of the arrow 63 through the opening at 46. The electric motor 49 which drives the blades 51 forces this air upwardly in the direction of the arrows 64 and about the pipe 57 over the combustion chambers and thence downwardly and outwardly as shown by the further arrows 65. Assuming that the vanes 45 are closed, there will be a greater percentage of heat traveling in the direction explained and in regulating the vanes 45 can be opened thereby throwing a greater portion of the heat upwardly through the top grill.

If it is desired to use the unit without employing the fan or to use a natural draft, the grill flaps 45 can be positioned vertically allowing a natural draft to rise in the same relative manner. It will be noted that the plate 54 is spaced a distance beyond the bottom opening 20 of the burner 19 leaving the space 66 therebetween. During forced draft, by means of the blower, a portion of the air will thus for forced through the opening 66 and into the burner thereby providing a forced draft feature to insure a positive supply of air to the burner.

It will be noted that the channels 55 which are spaced from the sides of the member 52 provide a restricted area for the reception of such forced air. The cold air enters the rear of the arrangement as explained in an area bounded substantially by the dotted lies 67 and the heated air passes downwardly and along the curved portions of the base and about the rest of the perimeter thereof not occupied by that portion which receives the cold air.

In other words, as indicated by the small arrows 68 there is a wide spread passage of hot air practically about the entire base of the unit with the exception of the rear. The curves 28 materially assist in throwing the heat in a positive manner outwardly and tend to sweep the heated air currents along this contour with the highest possible efficiency.

The other features of radiation as explained in the heater shown in Figures 1 to 3 also are present in this construction. The space 34 provides a large cross section for the heated air currents to travel in which cross section is disposed adjacent the floor level to secure the greatest possible spread in a certain restricted area laterally as well as vertically. It will be understood that bases of different shapes than the rectangular type described can be employed and still be within the spirit of my invention.

It will be noted that the air currents traveling in the direction of the arrows 64 are restricted by the side partitions 56 and are thus confined to an area directly passing over the pipe 57. Since the pipe 57 is connected between the two combustion chambers 22, there will be an effect of the air currents directly wiping over this pipe and in intimate contact therewith so that a materially increased heat efficiency is effected thereby heating the air currents to a substantially larger degree.

A further important advantage of this type of heater is that of rendering it more efficient in fall or spring months when it is not desired to use fuel in both burners 19. For instance, according to this structure, the right hand burner 19 need only be employed for burning purposes. The combustion products will pass through the pipe 57 into the left hand chamber and thence outwardly through the flue pipe 58. Even though the left hand burner 19 is not being utilized for combustion purposes, nevertheless, the hot gases will pass through both combustion chambers thereby transmitting heat to the same almost as well as both burners.

In this manner the left hand combustion chamber will still serve to radiate heat which will be absorbed and transmitted by the aforesaid air currents so that as a result, the heat efficiency of the unit will be considerably greater than that employed if only a single combustion chamber were used, and yet the arrangement will not require the use of fuel for both burners. This also provides a more efficient arrangement than that type of structure wherein the flue pipe such as 58 leads into the transverse pipe 57, since the combustion chambers 22 are connected in series instead of parallel to the chimney, thereby causing the heat travel to pass through both drums before passing to the chimney.

It will be noted that a natural vertical circulation of air is provided at all times between the outer casing 10 and the inner shell 40 regardless of the position of the shutters 45, thereby insuring a natural draft in combination with the forced draft.

Among other advantages readily apparent from the description, it will be noted that I have provided a heater having an efficient base structure, which insures intimate contact of the air currents with the heating elements, which includes means for providing a restricted cross section for force draft and a larger cross section for natural draft, that I have provided a heater employing a plurality of burners with a method of increasing the efficiency of all of the burners by using less than the total number, that I have provided means for spreading the heating area to a maximum extent and around the base of the heater and that I have provided a simple arrangement which can be readily operated and cleaned.

Some changes may be made in the construction and arrangement of the parts of my invention without departing from the real spirit and purpose of my invention, and it is my intention to cover by my claim any modified forms of structure or use of mechanical equivalents, which may be reasonably included within their scope.

I claim as my invention:

A heater comprising a base member, said base member including end and side members having substantially concave configurations, a blower fan attached within said base member, a pair of heating elements attached above said base member, a pair of vertical spaced partitions attached between said heating elements, a casing enclosing said heating elements and spaced therefrom, said casing providing means whereby heat passing upwardly along said heating elements will thence be deflected downwardly against said concave configurations, and thereby thence deflected from said configurations, the space between said partitions being positioned above said blower fan to additionally constrict and direct air currents thrown vertically thereby, said heating elements including heater drums, a connecting pipe member attached between said drums, said connecting pipe member being positioned vertically above the space between said partitions, said base member having a rear opening communicating to said blower fan, said casing having lower side edges vertically spaced above the lower portions of said base member and being laterally spaced from the top of said base.

JAMES T. GROTENHUIS.